United States Patent
Klein et al.

(10) Patent No.: US 7,670,687 B2
(45) Date of Patent: Mar. 2, 2010

(54) AMBER-COLORED POLYESTER FILM WITH PARTICULAR SUITABILITY FOR METALLIZATION AND STEEL-LAMINATION

(75) Inventors: Oliver Klein, Ockenheim (DE); Matthias Konrad, Hofheim (DE); Holger Kliesch, Ginsheim-Gustavsburg (DE); Bodo Kuhmann, Runkel (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 12/138,545

(22) Filed: Jun. 13, 2008

(65) Prior Publication Data
US 2008/0318073 A1    Dec. 25, 2008

(30) Foreign Application Priority Data
Jun. 20, 2007    (DE) .................. 10 2007 028 348

(51) Int. Cl.
*B32B 15/09* (2006.01)
*B32B 27/08* (2006.01)
*B32B 27/20* (2006.01)
*B32B 27/36* (2006.01)
*B32B 37/15* (2006.01)

(52) U.S. Cl. .............. 428/458; 428/212; 428/215; 428/336; 428/339; 428/346; 428/347; 428/349; 428/355 R; 428/457; 428/480; 428/910; 264/173.16; 264/173.18; 264/288.4; 264/290.2; 156/297; 156/299; 427/250; 427/404

(58) Field of Classification Search .............. None
See application file for complete search history.

(56) References Cited

U.S. PATENT DOCUMENTS

| | | | | |
|---|---|---|---|---|
| 4,267,306 A | * | 5/1981 | Davis et al. | 528/226 |
| 4,359,570 A | * | 11/1982 | Davis et al. | 528/289 |
| 4,521,556 A | * | 6/1985 | Adams | 524/88 |
| 4,654,399 A | | 3/1987 | Callander et al. | |
| 4,965,302 A | * | 10/1990 | Hirahara et al. | 524/83 |
| 4,999,418 A | * | 3/1991 | Krutak et al. | 528/272 |
| 5,728,439 A | * | 3/1998 | Carlblom et al. | 428/36.91 |
| 5,770,301 A | * | 6/1998 | Murai et al. | 428/213 |
| 5,840,825 A | * | 11/1998 | Carlblom et al. | 528/183 |
| 6,346,318 B1 | * | 2/2002 | Panchyshyn | 428/212 |
| 6,420,019 B1 | * | 7/2002 | Peiffer et al. | 428/332 |
| 6,423,401 B2 | * | 7/2002 | Peiffer et al. | 428/216 |

(Continued)

FOREIGN PATENT DOCUMENTS

CA         2 363 351 A1    5/2003

(Continued)

*Primary Examiner*—Vivian Chen
(74) *Attorney, Agent, or Firm*—ProPat, L.L.C.

(57) ABSTRACT

The present invention relates to a biaxially oriented polyester film, which
a) has a base layer B, which includes a yellow dye and a red dye,
b) has, on each side of the base layer B, at least one layer (A or C) which includes, based on the weight of layer A or C, less than 0.01% by weight of the yellow dye and less than 0.01% by weight of the red dye, and
c) the film has one absorption maximum lying at from 400 to 500 nm in the UV/visible spectrum from 400 to 800 nm.

Preferred dyes are anthraquinone dyes and perinone dyes; the polyester is preferably PET. After metallization or lamination, the film has a gold appearance, and is a suitable packaging material.

20 Claims, 1 Drawing Sheet

U.S. PATENT DOCUMENTS

| | | | |
|---|---|---|---|
| 6,569,517 B1 | 5/2003 | McGurran et al. | |
| 6,716,898 B2 * | 4/2004 | Weaver et al. | 524/88 |
| 6,777,099 B2 * | 8/2004 | Tano et al. | 428/480 |
| 6,787,589 B2 * | 9/2004 | Weaver et al. | 523/508 |
| 6,797,358 B2 * | 9/2004 | Murschall et al. | 428/141 |
| 6,797,359 B2 * | 9/2004 | Janssens et al. | 428/141 |
| 6,852,388 B2 * | 2/2005 | Murschall et al. | 428/141 |
| 6,855,758 B2 * | 2/2005 | Murschall et al. | 524/195 |
| 6,863,954 B2 * | 3/2005 | Peiffer et al. | 428/141 |
| 6,879,438 B2 * | 4/2005 | Masuda | 359/359 |
| 6,881,470 B2 * | 4/2005 | Murschall et al. | 428/141 |
| 7,157,132 B2 * | 1/2007 | Murschall et al. | 428/141 |
| 7,223,467 B2 * | 5/2007 | Kunugihara | 428/328 |
| 7,238,419 B2 * | 7/2007 | Kern et al. | 428/328 |
| 2003/0171465 A1 * | 9/2003 | Kliesch et al. | 524/127 |
| 2004/0219316 A1 * | 11/2004 | Takahashi et al. | 428/35.7 |
| 2005/0042468 A1 * | 2/2005 | Peiffer et al. | 428/480 |

FOREIGN PATENT DOCUMENTS

| | | |
|---|---|---|
| DE | 100 02 155 A1 | 7/2001 |
| DE | 101 35 795 A1 | 4/2002 |
| EP | 0 128 109 A2 | 12/1984 |
| EP | 1 234 848 A1 | 8/2002 |
| EP | 1 251 369 A2 | 10/2002 |
| EP | 1 714 998 A1 | 10/2006 |
| JP | 2006-142766 | 8/2006 |

* cited by examiner

US 7,670,687 B2

AMBER-COLORED POLYESTER FILM WITH PARTICULAR SUITABILITY FOR METALLIZATION AND STEEL-LAMINATION

CROSS-REFERENCE TO RELATED APPLICATIONS

This application claims priority to German Patent Application No. 10 2007 028 348.4 filed Jun. 20, 2007 which is hereby incorporated herein by reference in its entirety.

FIELD OF THE INVENTION

The invention relates to a multilayer, oriented polyester film which comprises dyes, which give the film an amber color and have a gold appearance after metallization or lamination of the film to a metal sheet (steel sheet). The invention moreover relates to a process for the production of said film and for its use for packaging and metal laminates of any type.

BACKGROUND OF THE INVENTION

The use of polyester films for packaging and for steel lamination is known (US 2005/042468, US 2004/219316, EP-A-1 234 848).

It is likewise known that yellow films and in particular amber-colored films have a gold appearance in combination with metals, such as steel and aluminum (CA 2363351).

Yellow or amber-colored polyester resins and, respectively, polyester films are described in EP-A-0 128 109 or in JP 2006-142766. However, the resins of EP-A-0 128 109 do not have a good gold appearance because they have too much blue tint. JP 2006-142766 describes films in which the dyes are present in an adhesive layer, but the result of this is migration of the dyes which is too high in particular for food applications, and which also in particular occurs at the relatively high temperatures of steel lamination, where it is likewise undesired.

SUMMARY OF ADVANTAGEOUS EMBODIMENTS OF THE INVENTION

It is an object of the present invention to provide a film which provides very good gold appearance after metallization or lamination to steel, exhibits no significant migration of the dyes on heating or treatment with chemicals, and gives good results when metallized and, respectively, gives good results when laminated to steel. The film is moreover intended to exhibit no significant degradation of the dyes at the high temperatures occurring during extrusion, thus providing the possibility of a very cost-effective production process via good recycling capability.

DETAILED DESCRIPTION OF ADVANTAGEOUS EMBODIMENTS OF THE INVENTION

Figure 1:
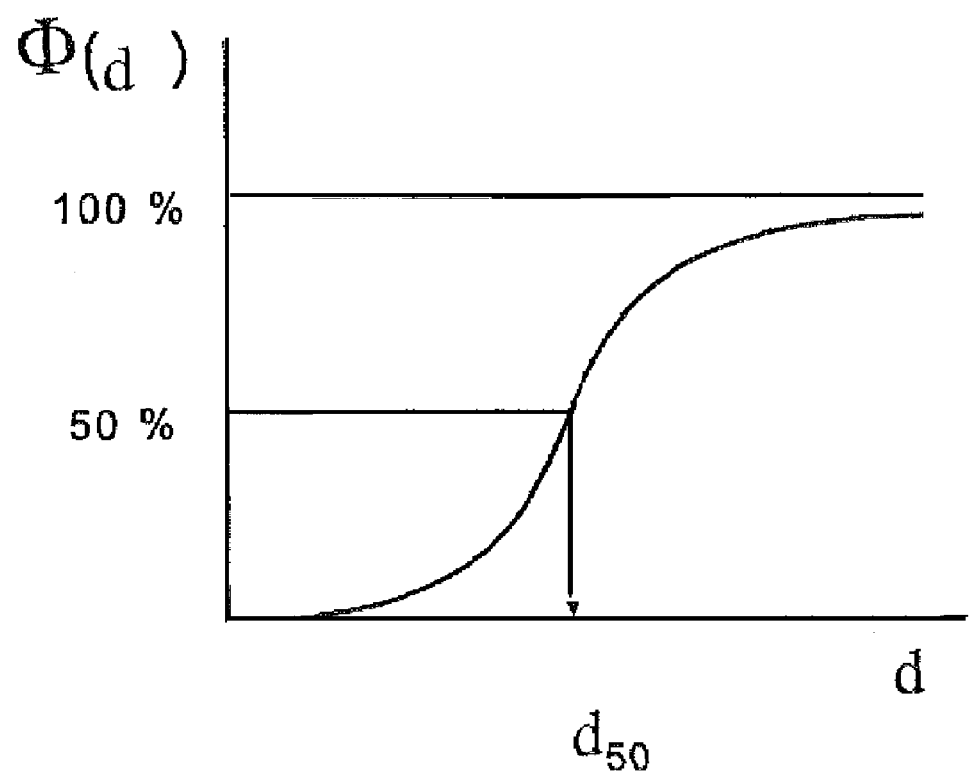
FIG. 1 is an exemplary cumulative particle size distribution curve.

This object is achieved via an at least three-layer, biaxially stretched polyester film which
a) has a base layer B, which comprises a yellow dye and a red dye,
b) has, on each side of the base layer B, at least one layer (A and, respectively, C) which comprises less than 0.1% by weight of the yellow dye and less than 0.1% by weight of the red dye, preferably less than 0.02% by weight of the yellow dye and less than 0.02% by weight of the red dye, and particularly preferably 0% by weight of the yellow dye and 0% by weight of the red dye, and
c) one absorption maximum lying at from 400 to 500 nm, preferably from 430 to 480 nm and particularly preferably from 450 to 460 nm in the UV/visible spectrum in the visible range from 400 to 800 nm.

The % by weight data here are based on the weight of the layer A and, respectively, C. It is also possible to use mixtures of various suitable red dyes and/or yellow dyes. The % by weight data here and also hereinafter are then also based on the entirety of the yellow and, respectively, red dyes. The inventive films preferably comprise no blue pigment/dyes as colorant substances.

It has proven advantageous here that the transmittances in % at from 430 to 480 nm are greater than 3%, preferably greater than 7%, and particularly preferably greater than 10%, since inadequate transmittances here lead to a colored film which does not then adequately allow passage of the reflection of the metal located underneath it, the effect of the gold appearance then being too dull or insufficiently bright.

It has moreover proven advantageous that the film has only one absorption maximum in the UV/visible spectrum at from 400 to 470 nm, since it is then easier to monitor compliance with the correct yellow/red ratio.

It has likewise proven advantageous that the thickness of the layers A and C is preferably at least 0.1 µm, in particular at least 0.5 µm, and particularly preferably at least 1 µm, since the risk of migration of the dyes from the base layer outward becomes greater as the dye-free or almost dye-free outer layers (A and C) become thinner.

It has moreover proven to be advantageous that the transmittances in % at from 600 to 700 nm is above 70%, preferably above 80%, and particularly preferably above 87%, since inadequate transmittances here can bring about a bluish gold luster, and relatively high transmittances in the visible-light spectral regions not necessary for the coloring lead to a brighter gold appearance.

The total thickness of the film is preferably from 5 to 150 µm, in particular from 7 to 25 µm, and preferably from 8 to 16 µm.

The inventive film has at least 3 layers (layer structure A-B—C) and has at least one dye-containing base layer B, the thickness of the base layer preferably being from 1 to 148 µm. By definition, the film has two flat external sides. Starting from the external side, between this and a dye-containing layer there is in each case at least one layer (A and, respectively, C) which is dye-free or almost dye-free and has less than 0.1% by weight of the yellow dye and of the red dye, or preferably <0.02% by weight of the yellow dye and of the red dye, and preferably comprises no yellow or/and red dye in the formulation, i.e. 0% by weight content of yellow or/and red dye. The thickness of said layers is preferably from 0.05 to 50 µm, in particular at least 0.1 µm, particularly preferably at least 0.5 µm, and ideally at least 1 µm. Between the layers A and C, there can be not only the base layer B but also further dye-containing and/or dye-free layers. Above (in the direction of the external side of the film) A and C, there can be further dye-free or almost dye-free layers.

In the preferred embodiment, the film has three layers, i.e. A and C are external 1 layers (layer structure A-B—C).

In another preferred embodiment, A and C are the external layers of the inventive film, and there is/are one or more dye-containing and/or dye-free layers located between A and C, other than the base layer B.

This means that the external layers of the inventive film are free of or almost free of yellow and red dyes (the amount in each case being smaller than 0.1% by weight, preferably <0.02% by weight, particular preference being given to no yellow or red dyes present in the formulation).

In one particularly preferred embodiment, at least one external layer of the film is sealable. Sealable means that said layer is substantially amorphous and thus can be bonded under contact pressure (>30 N/cm$^2$) at temperatures above 120° C. to another polyester film or to a steel sheet, without any additional adhesive.

In applications exposed to UV light, it has proven advantageous that at least the external layer facing toward the light comprises an amount of the order of from 0.1 to 10% by weight of a UV stabilizer. The content of UV stabilizer, based on the weight of the entire film, is advantageously from 0.1 to 5% by weight. Particularly suitable UV stabilizers are found in the group of the triazines (in particular triphenyl-substituted triazines). DE-A-101 35 795 gives a selection of suitable UV stabilizers.

It has moreover proven advantageous for colorfastness when from 0.01 to 1% by weight (based on the weight of B) of a free-radical scavenger (antioxidant) is preferably added to the dye-containing base layer B. DE-A-101 35 795, page 7, gives a selection of suitable substances.

The desired cost-effective production capability includes the capability of the inventive film, during its production, to undergo biaxial orientation without break-offs and to exhibit no visible color alteration even on use of about 40-80% of recycled material from the same film.

The desired good mechanical properties include inter alia a high modulus of elasticity in at least one direction of the film (longitudinal direction (MD) and/or transverse direction (TD)), preferably in both directions on the film, preferably greater than or equal to 500 N/mm$^2$, in particular greater than or equal to 2000 N/mm$^2$, and particularly preferably greater than or equal to 4000 N/mm$^2$.

In one preferred embodiment, the shrinkage of the film according to the invention is not greater than 25% at 200° C. in any direction on the film (either MD or TD). Shrinkage at 200° C. is preferably less than or equal to 10%, in particular less than or equal to 4%. This is advantageous, since it means that the film can give good results in metallizing even using relatively large layer thicknesses, and that no creasing occurs during metal lamination.

The inventive film comprises polyester as main polymer constituent (i.e. preferably an amount of from 55 to 100% by weight, in particular from 70 to 100% by weight, and particularly preferably from 90 to 100% by weight).

According to the invention, a polyester is a homopolyester, a copolyester, or a blend of various polyesters, where the form in which these are used can be either pure polymers or else polyester polymers comprising recycled material.

Polyesters contain repeat units which derive from dicarboxylic acids (100 mol %) and from diols (likewise 100 mol %). The inventive polyesters are preferably based on terephthalic acid or naphthaline-2,6-dicarboxylic acid as dicarboxylic acid and on ethylene glycol or 1,3-propanediol or 1,4-butanediol as diol (PET, PBT, PTT and PEN).

The inventive polyesters particularly preferably contain from 10 to 100 mol % of terephthalate (in particular >50 mol % and particularly preferably >90 mol % of terephthalate) or from 10 to 100 mol % of 2,6-naphthalate as dicarboxylic acid components, where the total amount of dicarboxylic acid components make up 100 mol %. The inventive polyester can preferably contain, as further dicarboxylic acid components, from 0 to 50 mol % of 2,6-naphthalate (if terephthalate has been used as main component), from 0 to 50 mol % of terephthalate (if naphthalate has been used as main component), from 0 to 20 mol % of isophthalate (preferably from 0.5 to 10 mol %), or else from 10 to 60 mol % of diphenyl-4,4'-dicarboxylate. The proportion of other dicarboxylic acid components, such as naphthaline-1,5-dicarboxylate, should, if these are present, not exceed 30 mol %, preferably not exceed 10 mol %, and in particular not exceed 2 mol %. Embodiments with at least 0.5 mol % of isophthalic acid, preferably at least 1 mol % of isophthalic acid, and particularly preferably at least 3 mol % of isophthalic acid, are particularly preferred, since these are less brittle and are more capable of adapting to changes of shape during subsequent processing.

The inventive polyester generally contains from 10 to 100 mol % of ethylene glycol (EG) as diol component, where the total amount of diol components makes up 100 mol %. If a mixture of different diols is used, it is advantageous not to exceed a proportion of 10 mol % of diethylene glycol, and preferably to use from 0.5 to 5 mol %. The proportions of other diol components, such as cyclohexanedimethanol, 1,3-propanediol and 1,4-butanediol, should advantageously not exceed 50 mol %, and are preferably less than 30 mol %, particularly preferably less than 10 mol %.

The polyesters and copolyesters mentioned can also be used in the form of mixtures.

The distribution of the dicarboxylic acid components and diol components here can be non-uniform across the individual layers. The polymer constitution of the individual layers (e.g. A-B—C) can therefore be identical or different.

In particular, the sealable layer present in one preferred embodiment has a modified copolyester constitution. Said sealable layer is applied via coextrusion to the other layers and preferably is comprised essentially of copolyesters mainly constituted of isophthalic acid units and of terephthalic acid units, and of ethylene glycol units. The remaining monomer units derive from other aliphatic, cycloaliphatic, or aromatic diols and, respectively, dicarboxylic acids which may also, for example, be present in the base layer. The preferred copolyesters which provide the desired adhesion-promoting properties are those comprised of ethylene terephthalate units and of ethylene isophthalate units. The proportion of ethylene terephthalate is preferably from 60 to 95 mol %, and the corresponding proportion of ethylene isophthalate is preferably from 40 to 5 mol %. Preference is further given to copolyesters in which the proportion of ethylene terephthalate is from 65 to 90 mol %, and the corresponding proportion of ethylene isophthalate is from 35 to 10 mol %, and very particular preference is given to copolyesters in which the proportion of ethylene terephthalate is from 70 to 85 mol %, and the corresponding proportion of ethylene isophthalate is from 30 to 15 mol %.

The polyester for the sealable layer can also contain aliphatic dicarboxylic acids, such as succinic acid, pimelic acid, suberic acid, azelaic acid, sebacic acid, glutaric acid, and adipic acid. Particular preference is given to azelaic acid, sebacic acid, and adipic acid.

The polyester for the sealable layer can moreover contain other aliphatic diols, e.g. 1,3-propanediol, 1,3-butanediol, 1,4-butanediol, 1,5-pentanediol, 2,2-dimethyl-1,3-propanediol, diethylene glycol, triethylene glycol and 1,4-cyclohexanedimethanol. Ethylene glycol, butylene glycol, and neopentyl glycol are preferred diols.

The thickness of the sealable layer is preferably from 0.5 to 25 μm, in particular from 0.75 to 10 μm, and particularly preferably from 1 to 5 μm.

The film can comprise, alongside the main polymer constituents mentioned, up to 45% by weight, preferably up to 30% by weight, particularly preferably up to 20% by weight, based on the weight of the film, of other polymers, e.g. polyetherimides (e.g. ULTEM® 1000 from GE Plastics Europe, NL), polycarbonate (e.g. MAKROLON® from Bayer, DE), polyolefins, such as COCs (e.g. TOPAS® from Ticona, DE), polyamides (ULTRAMID® from BASF, DE) inter alia. In the most preferred embodiment, no other polymers are present in the film alongside the inventive polyesters.

The polyesters are generally prepared from the diols and dicarboxylic acids mentioned, or from dicarboxylic esters, by processes known from the literature. The polyesters can be prepared either by the transesterification process using the conventional catalysts, such as the salts of Zn, of Ca, of Li, and of Mn, or by the direct esterification process.

The inventive film comprises, in the base layer B, a yellow dye and a red dye. The two dyes should have been dissolved in the polyester matrix or have been dispersed sufficiently finely that they do not lead to any significant rise in haze, since otherwise it is not possible to achieve the preferred transparency values mentioned in the introduction, at from 600 to 700 nm. This means that organic dyes are preferred for the purposes of the invention. In principle, it is possible to use any of the yellow/red dyes which are stable under the conventional processing temperatures of up to about 300° C. for polyesters and which lead to the desired absorption maximum at from 400 to 500 nm. For the purposes of the present invention, the term dyes also comprises pigments which meet the above-mentioned property requirements, i.e. the term dye comprises colorants either soluble or insoluble in the medium used.

In the case of the yellow dyes, anthraquinone dyes have proven particularly advantageous, and in the case of the red dyes perinone dyes have proven particularly advantageous.

Suitable yellow dyes are inter alia SOLVENT YELLOW 163, marketed as ORACET® Yellow GHS from Ciba SC, CH, and preferably Pigment Yellow 147, corresponding to C.I. Pigment 147 (C.I. No. 60645, CAS No. 4118-16-5), marketed as FILESTER® Yellow RNB by Ciba SC, CH. In the case of the red dyes, FILESTER® Red GA from Ciba SC, CH (Solvent Red 135, C.I. Pigment No. 564120, CAS No. 20749-68-2) has proven particularly advantageous. The two preferred dyes FILESTER® Red GA and FILESTER® Yellow RNB not only produce a particularly good gold hue but also prove to be particularly stable during repeated recycling of the film (melting in an extruder and granulation after film production with subsequent reuse), and are moreover particularly lightfast even when the resultant metallized sheets are exposed to outdoor weathering. The lightfastness can be still further improved via addition of from 0.5 to 5% by weight of PEN (polyethylene naphthalate) to the dye-free layers A and C (% by weight, based on the weight of the layers A or C).

The amount of dye needed for good gold appearance after metallization/metal-lamination depends on the thickness of the film. Transmittances in the wavelength range from 420 to 480 nm are preferably below 80% and particularly preferably below 70%, and ideally below 65%. Transmittance in the range mentioned is, however, preferably above 5%, particularly preferably above 25%, and ideally above 40%. Transmittance at 550 nm is preferably below 87%, particularly preferably below 85% and ideally below 80%. Transmittance at 550 nm is preferably above 40%, particularly preferably above 60%, and ideally above 70%.

It has proven advantageous that the yellowness index (YID) is from 20 to 60, preferably from 30 to 50, and particularly preferably from 35 to 45.

It has moreover proven advantageous that the lightness $L^*$ is greater than 80, preferably greater than 85, and preferably greater than 90.

It has moreover proven advantageous that $a^*$ is greater than 1 and smaller than 4, and it has proven particularly advantageous that $a^*$ is from 1.8 to 2.9.

It has moreover proven advantageous that $b^*$ is greater than 10 and smaller than 40, and it has proven particularly advantageous that $b^*$ is from 15 to 25. The data above relate to the finished film which has not been metallized or laminated.

In a film of thickness 15 μm, by way of example, a good gold appearance after metallization with aluminum or lamination to steel sheet is achieved via addition of from 0.10 to 0.5% by weight of "Pigment Yellow 147" and from 0.05 to 0.3% by weight of "Solvent Red 135", based on the total weight of the film. In the case of a 30 μm film, the limits have to be correspondingly divided by 2, to achieve an equally good appearance. (In the case of even greater thicknesses of the film, the factors alter slightly, and by way of example a good appearance is achieved at 150 μm when values for a film of thickness 15 μm are divided by 9). This dye system requires that, if yellow dye contents at the upper end of the range are selected, red dye contents at the upper end of the range are also selected, and vice versa. An excessive proportion of red in relation to yellow produces an undesired, rather copper-colored appearance of the film in contact with metal, and an inadequate proportion of red, or indeed an absence of the red dye, lead to a likewise undesired and unnatural gold luster that lacks warmth.

The gold appearance can be adapted to the respective application via the combination of red dye and yellow dye, by virtue of relatively small alterations in the relationship between the dyes, and the recycled materials arising during the production process are nevertheless mutually compatible over a wide range. If only a single amber-colored dye is used, it is only the intensity that can be adapted via the amount used, and not the actual color.

The content of dye (entirety of yellow and red) is preferably not higher than 10% by weight (based on the total weight of the film), preferably not higher than 5% by weight, and particularly preferably not higher than 1% by weight. As the total content of dye decreases, it becomes easier to adjust the other properties of the film, and there is less risk of migration of the dye out of the film.

The content of dye (entirety of yellow and red) should preferably be >002% by weight, and particularly preferably >0.05% by weight, and with particular preference >0.075% by weight, since variations in the metered amount can sometimes occur when the metered amounts are lower, resulting in undesired variations in the gold appearance (% by weight, based on the total weight of the film).

The inventive film can comprise, alongside the dyes, further additives, such as fillers and antiblocking agents. Typical fillers and antiblocking agents are inorganic and/or organic particles, such as silicon dioxide (natural, precipitated, or fumed), calcium carbonate, magnesium carbonate, barium carbonate, calcium sulfate, barium sulfate, lithium phosphate, calcium phosphate, magnesium phosphate, titanium dioxide (rutile or anatase), kaolin (hydrated or calcined), aluminum oxide, aluminum silicate, lithium fluoride, the calcium, barium, zinc, or manganese salts of the dicarboxylic acids used, or crosslinked polymer particles, e.g. polystyrene or polymethyl methacrylate particles, preference being given to use of silicon dioxide.

It is also possible to select a mixture of two or more of the abovementioned particle systems, or a mixture of particle systems with identical chemical constitution but different particle sizes. It is advantageous that the particles are added to the polyester before melting begins.

If further additives are present in the film, the total concentration of said particles is preferably less than 15% by weight, based on the total weight of the film, in particular less than 5% by weight, and particularly preferably less than 1% by weight, The median size ($d_{50}$ value) of the particles is preferably from 0.01 to 15 µm, in particular from 0.03 to 10 µm and particularly preferably from 0.05 to 4 µm. In one preferred embodiment, the proportion of particles whose $d_{50}$ value is greater than or equal to 4 µm is less than or equal to 2000 ppm, and particularly preferably less than or equal to 1000 ppm, since it is then easier to achieve the inventive absorption ranges.

It has proven advantageous that any sealable layer present comprises less than 0.3% by weight of particles, preferably less than 0.1% by weight (based on the weight of the sealable layer).

The inventive film can comprise further additives, such as UV stabilizers, flame retardants, hydrolysis stabilizers, and antioxidants, particular preference being given here to UV stabilizers from the TINUVIN® product line from Ciba SC, CH.

The film can also be coated in order to establish further properties. Typical coatings are in particular those having adhesion-promoting, antistatic, slip-improving, or release action. These additional layers can, of course, be applied to the film by way of in-line coating, by means of aqueous dispersions, after longitudinal stretching and prior to transverse stretching.

The additives, i.e. the dyes and any further fillers/antiblocking agents and other additives (such as UV stabilizers) present are preferably introduced into the polymer by means of a commercially available twin-screw extruder. In this process, a polyester according to the invention in pellet form is introduced into the extruder together with the particles/additives and is extruded, and then quenched in a water bath and then pelletized.

However, the additives can also be added directly during the polyester production. This process is less preferred for dyes and UV stabilizers, because of the additional thermal stress. In the case of the DMT process (DMT=dimethyl terephthalate as starting monomer), the additives are usually added after transesterification and, respectively, directly prior to polycondensation (e.g. by way of the transport line between transesterification vessel and polycondensation vessel), in the form of a glycolic dispersion. However, the addition can also take place before transesterification begins. In the case of the TPA process (TPA=terephthalic acid=terephthalic acid as starting monomer), the addition preferably takes place at the start of the polycondensation process. However, later addition is also possible. In this process it has proven advantageous that the glycolic dispersions are filtered prior to addition by way of a PROGAF PGF 57® (Hayward/Indiana, USA) filter.

The present invention also provides a process for the production of the inventive films. Production generally takes place via an extrusion process. It has proven particularly advantageous to add the dyes, and also any further additives used, such as particles, UV stabilizers, flame retardants, hydrolysis stabilizers, and antioxidants, in the amounts mentioned, in the form of masterbatches, prior to extrusion. In particular in the case of the dyes, addition directly into the extruder during production of the film is less preferred, since this can give greater variations in color.

In masterbatch technology, it is preferable that the grain size and the bulk density of the masterbatches are similar to the grain size and the bulk density of the polyester polymer used, thus achieving homogeneous dispersion, which gives homogeneous properties.

The inventive polyester films can be produced in the form of a multilayer film by known processes from a polyester polymer and, if appropriate, further raw materials.

If twin- and multi-screw extruders are used, the masterbatches, and also the other raw materials, can be extruded directly, without predrying. If single-screw extruders are used, it is advisable to dry the material for at least 1 hour at about 120 to 150° C. It has proven particularly advantageous that the extruder which extrudes the dye-containing base layer B is a twin- or multi-screw extruder, since the drying of the starting materials can thus be omitted and exposure of the dyes to unnecessary thermal stress can thus be avoided.

In the preferred coextrusion process for the production of the film, the melts corresponding to the individual layers of the film are coextruded through a flat-film die and quenched in the form of a substantially amorphous pre-film on a chill roll. In the case of three-layer structures for the film, it has proven advantageous that the die used is not a free-edge die, since otherwise there is a portion of the dye-containing base layer not covered by the outer layers, and there can then be a small amount of gas-evolution from the dyes in the region of the die, because of the very high temperatures. The pre-film is then reheated and oriented in at least one direction, or longitudinally and transversely, or transversely and longitudinally, or longitudinally, transversely, and again longitudinally and/or transversely. The temperatures of the film in the stretching process are generally from 10 to 60° C. above the glass transition temperature $T_g$ of the polyester used, and the longitudinal stretching ratio is preferably from 2 to 6, in particular from 3 to 4.5, and the transverse stretching ratio is preferably from 2 to 5, in particular from 3 to 4.5, and the stretching ratio for any second longitudinal and transverse stretching carried out is preferably from 1.1 to 5. The first longitudinal stretching can also be carried out simultaneously with the transverse stretching (simultaneous stretching). Heat-setting of the film then follows at oven temperatures of about 180 to 260° C., preferably from 220 to 250° C. The film is then cooled and wound.

In one preferred embodiment, the heat-setting takes place at temperatures of from 220 to 250° C., and the film is relaxed transversely at this temperature by at least 1%, preferably at least 2%.

In another preferred embodiment, the heat-setting takes place at from 220 to 250° C., and the film is transversely relaxed at this temperature by at least 1%, preferably by at least 2%, and is then again transversely relaxed at temperatures of from 180 to 150° C. again by at least 1%, preferably at least 2% in the cooling phase.

In another preferred embodiment, the film is stretched in MD and TD by a factor of at least 3, and the stretching here takes place in a simultaneous frame. The heats setting takes place at from 220 to 250° C., and the film is longitudinally and transversely relaxed by at least 1% at this temperature.

The inventive films have the good mechanical properties demanded. For example, the modulus of elasticity is greater than or equal to 500 N/mm² in at least one direction on the film.

The shrinkage of the film is not greater than 25% at 200° C. in any direction on the film (either MD or TD).

By virtue of the dye-free layers surrounding the dye-containing base layer, the production process does not give rise to any color-related gas-evolution or deposition of color-related oligomers, either in the region of extrusion or in the region of setting, these being phenomena observed with corresponding colored single-layer films or films with only one dye-free layer.

The film moreover exhibits very little or low migration of the dyes from the film, as shown by the stain test.

The film can be metallized by processes known from the literature (preferably metallization using aluminum in vacuo, or else sputtering using aluminum or silver). Lamination to steel sheets can take place via sealing to hot steel or by means of hot rolls, by processes likewise known from the literature, or via lamination using a suitable lamination adhesive.

The metallized film is suitable for many "gold-look" applications, such as coffee packaging, gloss-effect lamination of cartons, etc. Laminated to metal/steel, the film is suitable inter alia for "gold-look" tins. The inventive films are therefore preferably suitable for the production of packaging materials, in particular for foods and other consumable items.

The parameters or properties in the examples below were measured to the following standards or by the following methods;

Methods

Mechanical Properties

Modulus of elasticity, tensile strength, tensile strain, and $F_5$ value are measured longitudinally and transversely to ISO 527-1-2 with the aid of tensile strain measurement equipment (010 from Zwick, DE).

Shrinkage

Thermal shrinkage is determined on square film samples whose edge length is 10 cm. The specimens are measured precisely (edge length $L_0$), heat-conditioned at 200° C. in a convection drying cabinet for 15 min, and then measured precisely at room temperature (edge length L). Shrinkage is given by the equation $$\text{Shrinkage}[\%]=100 \cdot (L_0-L)/L_0$$

Measurement of Median Diameter $d_{50}$

Median diameter $d_{50}$ is determined by means of a laser on a Malvern MASTER SIZER (Malvern Instruments Ltd., UK) by the standard method. Examples of other measurement equipment are the Horiba LA 500 or the Sympathec HELOS, which use the same principle of measurement. The specimens for measurement are placed in a cell with water and this is then placed in the measurement equipment. The measurement procedure is automatic and also includes the mathematical determination of the $d_{50}$ value.

The $d_{50}$ value here is by definition determined from the (relative) cumulative curve of particle size distribution. The intersection of the 50% ordinate value with the cumulative curve directly gives the desired $d_{50}$ value on the abscissa axis (as illustrated in FIG. 1).

UV/Visible Spectra (Transmittance Measurement)

The transmittance of the films is measured in a UV/visible spectrometer (Lambda 3) from Perkin Elmer, USA, using air as background.

Color Parameters (CIE), Lightness, a*, b*

These values are determined on a spectrophotometer from BYK, DE. Equipment: color-sphere.

The measurement program is: auto-QC.

Yellowness Index

Yellowness index Y (YID) is the deviation from the colorless state in the "yellow" direction, and is measured to DIN 6167.

Stain Test

Liquids characteristic of foods are used for the test:

3% by weight acetic acid

10% by volume ethyl alcohol fat (PALMIN®, a coconut fat)

In order to obtain an atmosphere saturated with the vapors of the test liquid at the prescribed test temperature, the test liquid is placed on the base of a desiccator and the desiccator is placed in the drying cabinet at 50° C. for 30 min.

Two pieces of filter paper (white) are saturated with the test liquid. The film to be studied (10 cm$^2$) is then placed between the two layers of filter paper and compressed by applying a pressure of 0.7 kg/dm$^2$. The resultant package is sealed in the preconditioned desiccator for 5 hours at 50° C., together with a piece of identical size (blind specimen) of the test paper which has been saturated with the same test liquid but has not been brought into contact with the colored film.

The filter papers placed in contact with the material are then removed from the film and compared with the blind specimen. The test is repeated 3 times with each test liquid. It is regarded as passed if none of the specimens exhibits a visually discernible stain, and none of the filter papers brought into contact with the colored film in the presence of a test liquid exhibits a difference in yellowness index, a* or b* of more than 1.5 from the average value of the blind specimens. Yellowness index, a* and b* are determined in reflection in BYK color-sphere measurement equipment from BYK, LDE.

Production of Film

Polyester chips are mixed in the ratios stated in the examples and in each case melted in twin-screw extruders, without pre-drying. The molten polymer extrudates are combined in a coextrusion dye and drawn off by way of a take-off roll (roll temperature 20° C.). The resultant film is stretched by a factor of 3.9 in the machine direction at 114° C. (film temperature in the stretching gap), and transverse stretching by a factor of 3.8 is carried out at 111° C. in a frame. The film is then heat-set at 229° C. and transversely relaxed by 1% at temperatures of from 229 to 200° C. and again by 1% at temperatures of from 180 to 150° C. The production speed (final film speed) is 300 m/min.

EXAMPLES

The following raw materials were used in the examples (with intrinsic viscosity of from 0.57 to 0.75; all data in % by weight).

Masterbatch MB1

3% by weight of Filester Yellow RNB from Ciba SC and 97% by weight of polyethylene terephthalate RT49 (PET) from Invista, DE. Produced via mixing of dye and PET in a conventional twin-screw extruder.

Masterbatch MB2

1.7% by weight of Filester Red GA from Ciba SC and 98.3% by weight of polyethylene terephthalate RT49 (PET) from Invista, DE. Produced via mixing of dye and PET in a conventional twin-screw extruder.

Masterbatch MB3

1% by weight of SYLYSIA 310 from Fuji Silysia, JP, in PET. The pigment (SiO$_2$) was added during transesterification.

Polymer P1

100% by weight of polyethylene terephthalate RT49

Polymer P2

Polyester (=copolymer comprised of 78 mol % of ethylene terephthalate and 22 mol % of ethylene isophthalate). The glass transition temperature of the polyester was about 75° C.

Example 1

An ABC film whose base-layer thickness is 12 μm and whose outer-layer-A and -C thicknesses are each 2 μm was produced as stated above.

Sealable outer layer A: 100% of P2

Mixture of raw materials for base layer B: 10% of MB1/ 10% of MB2/80% of P1

Mixture of raw materials for an outer layer C: 10% of MB3/90% of P1

Example 2

An ABC film whose base-layer thickness is 47 μm was produced as stated above with outer layers: A (1 μm) and C (2 μm). The production speed was 100 m per min.

Outer layer A: 2% of MB3/98% of P1

Mixture of raw materials for base layer B: 1.5% of MB1/ 1.7% of MB2/46.8% of P1, 50% of recycled material of the same type Mixture of raw materials for outer layer C: 5% of MB3/ 95% of P1

Comparative Example 1

An ABC film whose base-layer thickness is 6 μm and whose outer-layer-A and -C thicknesses are each 5 μm was produced as stated above.

Sealable outer layer A: 70% of P2/15% of MB1/15% of MB2

Mixture of raw materials for base layer B: 100% of P1

Mixture of raw materials for an outer layer C: 70% of P1/15% of MB1/15% of MB2

Comparative Example 2

An ABC film whose base-layer thickness is 12 μm and whose outer-layer-A and -C thicknesses are each 2 μm was produced as stated above.

Sealable outer layer A: 100% of P2

Mixture of raw materials for base layer B: 10% of MB1/ 90% of P1

Mixture of raw materials for an outer layer C: 10% of MB3/90% of P1

The properties of the films from Examples 1 and 2 and from comparative examples 1 and 2 can be found in the table.

TABLE

| | Modulus of elasticity MD in N/mm$^2$ | Modulus of elasticity TD in N/mm$^2$ | Shrinkage, MD 200° C. % | Shrinkage TD 200° C. % | Stain test Pass Yes/No | Gold appearance after single-side metallization using Al |
|---|---|---|---|---|---|---|
| Example | | | | | | |
| 1 | 4200 | 5050 | 4.3 | 2.3 | Yes | Good |
| 2 | 4140 | 4930 | 4.1 | 2.4 | Yes | Good |
| Comparative example | | | | | | |
| 1 | 4320 | 5110 | 4.2 | 2.2 | No | Good |
| 2 | 4230 | 5070 | 4.3 | 2.2 | Yes | Poor, too yellow |

The running reliability of the films was comparable (number of break-offs) with that of dye-free film of identical thickness and layer structure. An increased number of break-offs occurred only in comparative example 1. Colored deposits on the stretching rolls and in the region of the take-off roll, and also in the region of the setting frame, also occurred during the production process of comparative example 1.

All of the films exhibited only one peak at from 400 to 470 nm and had a transmittance of from 70% to 25% at from 420 to 480 nm. All of the films other than comparative example 2 exhibited a transmittance of less than 85 and >40% at 550 nm. Comparative example 2 gave 88.5%.

That which is claimed:

1. A biaxially oriented polyester film comprising
   a) a base layer B comprising colorant consisting of a yellow dye and a red dye, and
   b) on each side of the base layer B, at least one layer (A or C), said layer A and/or C comprising, based on the weight of respective layer A or C, less than 0.1% by weight of the yellow dye and less than 0.1% by weight of the red dye, c) wherein said film exhibits one absorption maximum lying at from 400 to 500 nm in the UV/visible spectrum from 400 to 800 nm, and said film further exhibits a transmittance of above 80% in the visible spectrum ranging from 600 to 700 nm.

2. The polyester film as claimed in claim 1, wherein the layers A and C comprise no yellow and red dye.

3. The polyester film as claimed in claim 1, wherein the yellow dye is an anthraquinone dye and the red dye is a perinone dye.

4. The polyester film as claimed in claim 1, wherein the yellow dye corresponds to CAS No. 4118-16-5 and the red dye corresponds to CAS No. 20749-68-2.

5. The polyester film as claimed in claim 1, wherein the proportion of red and of yellow dye in the film is from 0.02 to 10% by weight.

6. The polyester film as claimed in claim 1, wherein the polyester of the film has ethylene terephthalate units and/or ethylene 2,6-naphthalate units.

7. The polyester film as claimed in claim 1, wherein an external layer of the film is sealable.

8. The polyester film as claimed in claim 7, wherein the sealable external layer comprises a copolyester having ethylene terephthalate units and ethylene isophthalate units.

9. The polyester film as claimed in claim 1, wherein at least one external layer of the film comprises antiblocking agents.

10. The polyester film as claimed in claim 1, comprising an A-B—C layer structure.

11. The polyester film as claimed in claim 1, wherein A and C are the external layers of the film and there is/are one or more dye-containing and/or dye-free layers located between A and C and the base layer B.

12. A process for the production of a polyester film as claimed in claim 1, comprising the steps of
a) producing a multilayer film via coextrusion,
b) longitudinally and transversely stretching the film, and
c) heat-setting the stretched film.

13. The process as claimed in claim 12, further comprising relaxing the film transversely by at least 1% during heat-setting.

14. Packaging material comprising polyester film as claimed in claim 1.

15. A process for producing metallized polyester film or metal laminate comprising respectively either (i) metallizing or (ii) laminating metal to a film as claimed in claim 1.

16. A metallized polyester film comprising a polyester film as claimed in claim 1.

17. A metal laminate comprising a polyester film as claimed in claim 1.

18. The polyester film as claimed in claim 1, wherein said layer A and/or C have a thickness of at least 0.1 microns.

19. The polyester film as claimed in claim 1, wherein said film has a transmittance of from 25% to 70% in the spectrum ranging from 420 to 480 nm and a transmittance of from greater than 40% to less than 85% at 550 nm.

20. An amber colored biaxially oriented polyester film comprising
a) a base layer B comprising colorant consisting of yellow dye and red dye, and
b) on each side of the base layer B, at least one layer (A or C), said layer A and/or C comprising, based on the weight of respective layer A or C, less than 0.1% by weight of the yellow dye and less than 0.1% by weight of the red dye,
c) wherein said film exhibits one absorption maximum lying at from 400 to 500 nm in the UV/visible spectrum from 400 to 800 nm, and said film has a transmittance of greater than 7% at 430 to 480 nm.

* * * * *